(12) United States Patent
Kajikiya

(10) Patent No.: US 12,237,696 B2
(45) Date of Patent: Feb. 25, 2025

(54) ANTENNA DEVICE AND WIRELESS POWER TRANSMISSION DEVICE HAVING THE SAME

(71) Applicant: TDK Corporation, Tokyo (JP)

(72) Inventor: Shoma Kajikiya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1 day.

(21) Appl. No.: 18/458,453

(22) Filed: Aug. 30, 2023

(65) Prior Publication Data

US 2024/0079911 A1    Mar. 7, 2024

(30) Foreign Application Priority Data

Sep. 7, 2022   (JP) ................. 2022-142165

(51) Int. Cl.
*H02J 50/50*     (2016.01)
*H01F 27/28*     (2006.01)
*H01Q 7/00*      (2006.01)
*H02J 50/12*     (2016.01)

(52) U.S. Cl.
CPC ............ *H02J 50/502* (2020.01); *H01F 27/28* (2013.01); *H01Q 7/00* (2013.01); *H02J 50/12* (2016.02)

(58) Field of Classification Search
CPC ......... H02J 50/50; H02J 50/502; H01F 27/28; H01Q 7/00
See application file for complete search history.

(56) References Cited

U.S. PATENT DOCUMENTS

2015/0280322 A1    10/2015   Saito et al.

FOREIGN PATENT DOCUMENTS

| JP | 2001-251130 A | 9/2001 |
|---|---|---|
| JP | 2009-065426 A | 3/2009 |
| JP | 2014-099805 A | 5/2014 |

*Primary Examiner* — Robert L Deberadinis
(74) *Attorney, Agent, or Firm* — XSENSUS LLP

(57) ABSTRACT

Disclosed herein is an antenna device that includes a first coil wound in a plurality of turns, and a second coil disposed outside the first coil as viewed in a coil axis direction of the first coil. The first coil is configured such that a first interval between turns in a first direction is larger than a second interval between turns in a second direction perpendicular to the first direction. An inter-coil distance between an outer edge of the first coil and an inner edge of the second coil is larger than the second interval as viewed in the coil axis direction.

10 Claims, 10 Drawing Sheets

ANTENNA DEVICE AND WIRELESS POWER TRANSMISSION DEVICE HAVING THE SAME

CROSS-REFERENCE TO RELATED APPLICATION

This application claims the benefit of Japanese Patent Application No. 2022-142165, filed on Sep. 7, 2022, the entire disclosure of which is incorporated by reference herein.

BACKGROUND

The present disclosure relates to an antenna device and a wireless power transmission device having the same.

JP 2009-065426A discloses an antenna module having an antenna coil for communicating with an RFIC tag and a booster coil for extending a communication distance.

However, the antenna module described in JP 2009-065426A does not necessarily provide a sufficient coverage area. Further, a communication distance may become insufficient depending on the degree of coupling between the antenna coil and the booster coil.

SUMMARY

An antenna device according to the present disclosure includes a first coil wound in a plurality of turns and a second coil disposed outside the first coil as viewed in the coil axis direction of the first coil. The first coil is configured such that a first interval between turns in a first direction is larger than a second interval between turns in a second direction perpendicular to the first direction, and the inter-coil distance between the outer edge of the first coil and the inner edge of the second coil is larger than the second interval as viewed in the coil axis direction. With this configuration, there can be achieved an antenna device providing a sufficiently wide coverage area and communication distance.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

An object of the present disclosure is to provide an antenna device providing a wide coverage area and communication distance.

Preferred embodiments of the present disclosure will be explained below in detail with reference to the accompanying drawings.

Figure 1:
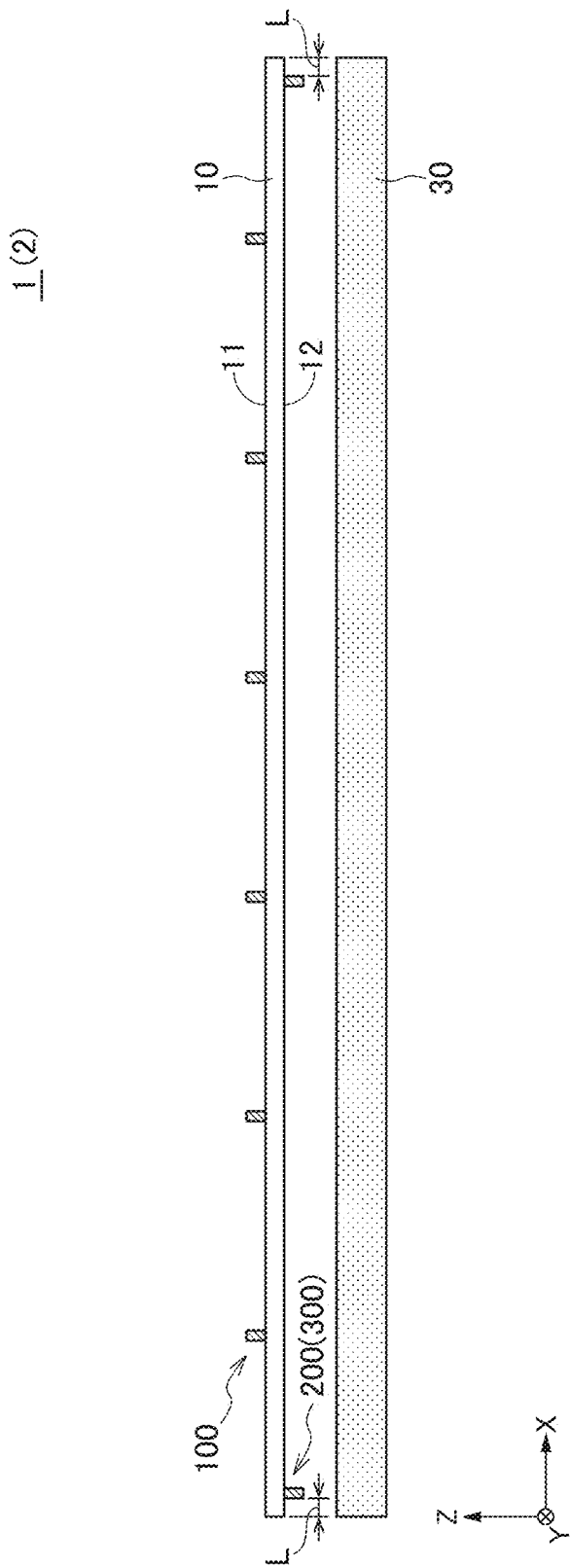
FIG. 1 is a schematic cross-sectional view illustrating the configuration of an antenna device 1 according to a first embodiment of the present disclosure.

FIG. 1 is a schematic cross-sectional view illustrating the configuration of an antenna device 1 according to a first embodiment of the present disclosure.

As illustrated in FIG. 1, the antenna device 1 according to the first embodiment includes a first substrate 10, a first coil 100 formed on one surface 11 of the first substrate 10, and a second coil 200 formed on the other surface 12 of the first substrate 10. The first substrate 10 is a film made of an insulating resin material such as PET (Polyethylene Terephthalate) or PI (Polyimide).

The first coil 100 functions as an antenna coil for performing near-field communication (NFC). The second coil 200 functions as a booster coil for extending the communication distance. The surface 12 of the first substrate 10 is covered with a magnetic member 30, whereby inductance is enhanced. The magnetic member 30 may be a sheet-like material. The magnetic member 30 may be coated on the surface 12 of the first substrate 10.

Figure 2:
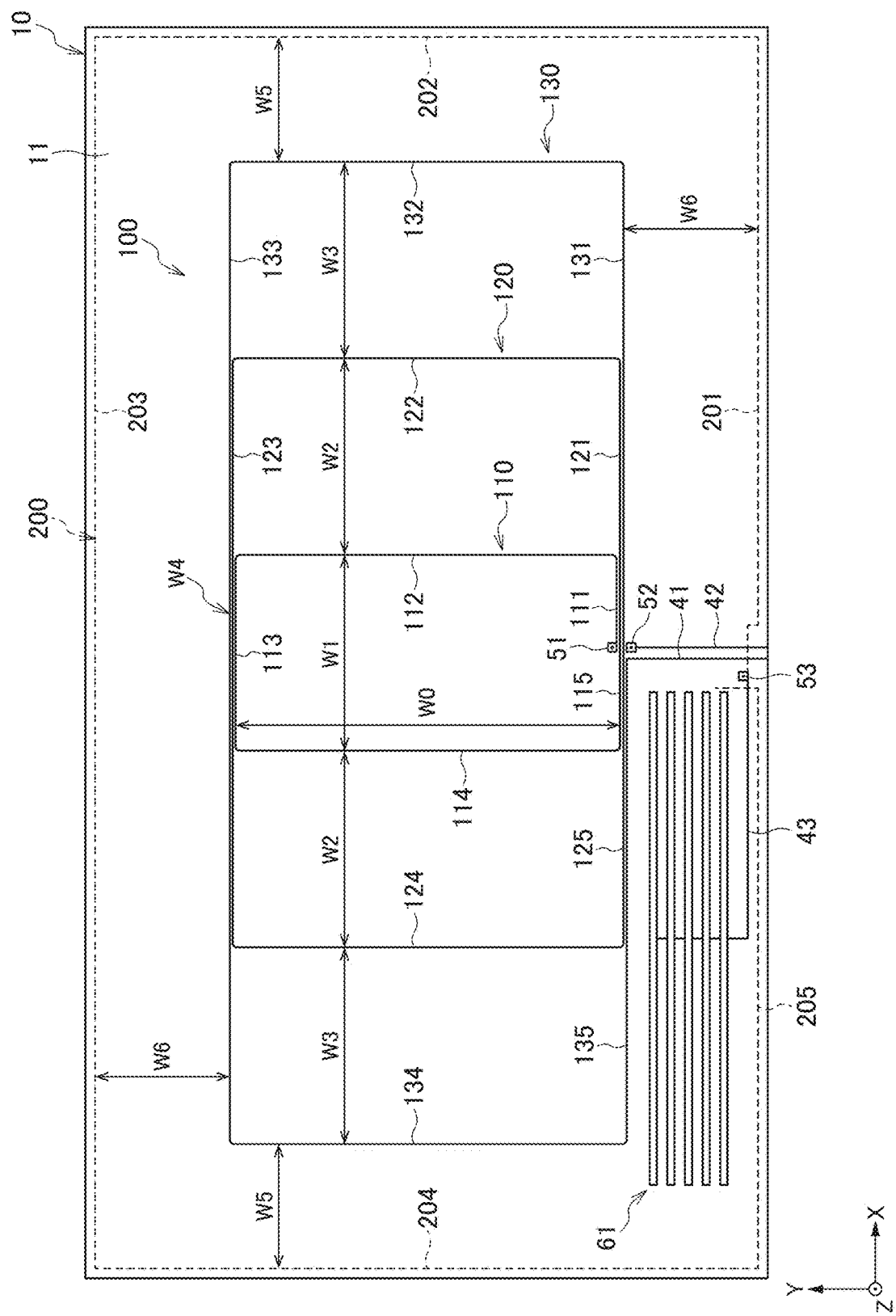
FIG. 2 is a schematic plan view for explaining the pattern shapes of conductor patterns formed on the surface 11 of the first substrate 10 in the first embodiment.

FIG. 2 is a schematic plan view for explaining the pattern shapes of conductor patterns formed on the surface 11 of the first substrate 10.

As illustrated in FIG. 2, the first coil 100, conductor patterns 41 to 43, and a first capacitor electrode pattern 61 are formed on the surface 11 of the first substrate 10. These conductor patterns are each formed of a conductive material such as copper, aluminum, or an alloy thereof. The same applies to other conductor patterns to be described later. The first substrate 10 has a rectangular shape with a size larger in the X-direction (first direction) than that in the Y-direction (second direction).

The first coil 100 is a coil pattern wound in about three turns and includes a first turn 110 as the innermost turn, a second turn 120 as the second turn counted from the innermost (or outermost) periphery, and a third turn 130 as the outermost turn. The first coil 100 has a coil axis extending in the Z-direction. The outer peripheral end of the first coil 100 is connected to the conductor pattern 41. The inner peripheral end of the first coil 100 is connected to the conductor pattern 42 through via conductors 51, 52 penetrating the first substrate 10 and a conductor pattern 44 to be described later. The end portions of the respective conductor patterns 41 and 42 constitute a pair of signal terminals connected to the first coil 100.

The first turn 110, second turn 120, and third turn 130 are wound in a substantially rectangular shape. The first turn 110 has a shape with a size larger in the Y-direction than that in the X-direction. On the other hand, the second and third turns 120 and 130 have a shape with a size larger in the X-direction than that in the Y-direction.

The first turn 110 includes sections 111, 113, and 115 extending in the X-direction and sections 112 and 114 extending in the Y-direction. When the inner peripheral end is set as the starting point of winding, the first turn 110 is wound to form the sections 111, 112, 113, 114, and 115 in this order. The section 113 has a length of W1 in the X-direction, and the sections 112 and 114 each have a length of W0 in the Y-direction. The length W1 is smaller than the length W0. The length W1 corresponds to the opening width of the first turn 110 in the X-direction, and the length W0 corresponds to the opening width of the first turn 110 in the Y-direction.

The second turn 120 includes sections 121, 123, and 125 extending in the X-direction and sections 122 and 124 extending in the Y-direction. When a connection portion with the first turn 110 is set as the starting point of winding, the second turn 120 is wound to form the sections 121, 122, 123, 124, and 125 in this order. The interval between the section 122 of the second turn 120 and the section 112 of the first turn 110 in the X-direction is W2. Similarly, the interval between the section 124 of the second turn 120 and the section 114 of the first turn 110 in the X-direction is also W2. Accordingly, the length of the section 123 in the X-direction (or the opening width of the second turn 120 in the X-direction) is obtained by adding, to the sum of W1+W2+W2, the pattern widths of the sections 112 and 114 of the first turn 110 in the X-direction. The interval W2 may be substantially equal to the length W1. The interval between the section 123 of the second turn 120 and the section 113 of the first turn 110 in the Y-direction is W4. Similarly, the interval between the section 121 of the second turn 120 and the section 111 of the first turn 110 in the Y-direction, and the interval between the section 125 of the second turn 120 and the section 115 of the first turn 110 in the Y-direction are each also W4. The interval W4 is sufficiently smaller than the interval W2 and may be the minimum space for the conductor pattern that can be formed on the surface 11 of the first substrate 10. In this case, the length of each of the sections 122 and 124 in the Y-direction (or the opening width of the second turn 120 in the Y-direction), which is substantially equal to W0, is obtained by adding, to the sum of W0+W4+W4, the pattern width of the section 111 or 115 of the first turn 110 in the Y-direction and the pattern width of the section 113 of the first turn 110 in the Y-direction.

The third turn 130 includes sections 131, 133, and 135 extending in the X-direction and sections 132 and 134 extending in the Y-direction. When a connection point with the second turn 120 is set as the starting point of winding, the third turn 130 is wound to form the sections 131, 132, 133, 134, and 135 in this order. The interval between the section 132 of the third turn 130 and the section 122 of the second turn 120 in the X-direction is W3. Similarly, the interval between the section 134 of the third turn 130 and the section 124 of the second turn 120 in the X-direction is also W3. Accordingly, the length of the section 133 in the X-direction (or the opening width of the third turn 130 in the X-direction) is obtained by adding, to the sum of W1+W2+W2+W3+W3, the pattern widths of sections 112 and 114 of the first turn 110 in the X-direction and the pattern widths of sections 122 and 124 of the second turn 120 in the X-direction. The interval W3 may be substantially equal to the length W1 and interval W2 (i.e., W1≈W2≈W3). The interval between the section 133 of the third turn 130 and the section 123 of the second turn 120 in the Y-direction is W4. Similarly, the interval between the section 131 of the third turn 130 and the section 121 of the second turn 120 in the Y-direction and the interval between the section 135 of the third turn 130 and the section 125 of the second turn 120 in the Y-direction are each also W4. Accordingly, the length of each of the sections 132 and 134 in the Y-direction (or the opening width of the third turn 130 in the Y-direction) is obtained by adding, to the sum of W0+W4+W4+W4+W4, the pattern width of the section 111 or 115 of the first turn 110 in the Y-direction, the pattern width of the section 113 of the first turn 110 in the Y-direction, the pattern width of the section 121 or 125 of the second pattern 120 in the Y-direction, and the pattern width of the section 123 in the Y-direction and is substantially W0 when the interval W4 and the coil pattern width are very small. The term "substantially equal" used here includes variations due to manufacturing error or other factors. The range of error may be within 5%, for example.

As described above, the first coil 100 is configured such that the intervals W2 and W3 (first interval) between the turns in the X-direction are larger than the interval W4 (second interval) between the turns in the Y-direction. This allows the coverage area to be extended in the X-direction. Therefore, the antenna device 1 according to the resent embodiment is suitable for use requiring a coverage area having such characteristics.

The conductor pattern 43 formed on the surface 11 of the first substrate 10 has one end connected to the first capacitor electrode pattern 61 and the other end connected to a via conductor 53 penetrating the first substrate 10. The first capacitor electrode pattern 61 is disposed outside the first coil 100 and has a plurality of conductor patterns which are arranged in the Y-direction and extend in the X-direction.

Figure 3:
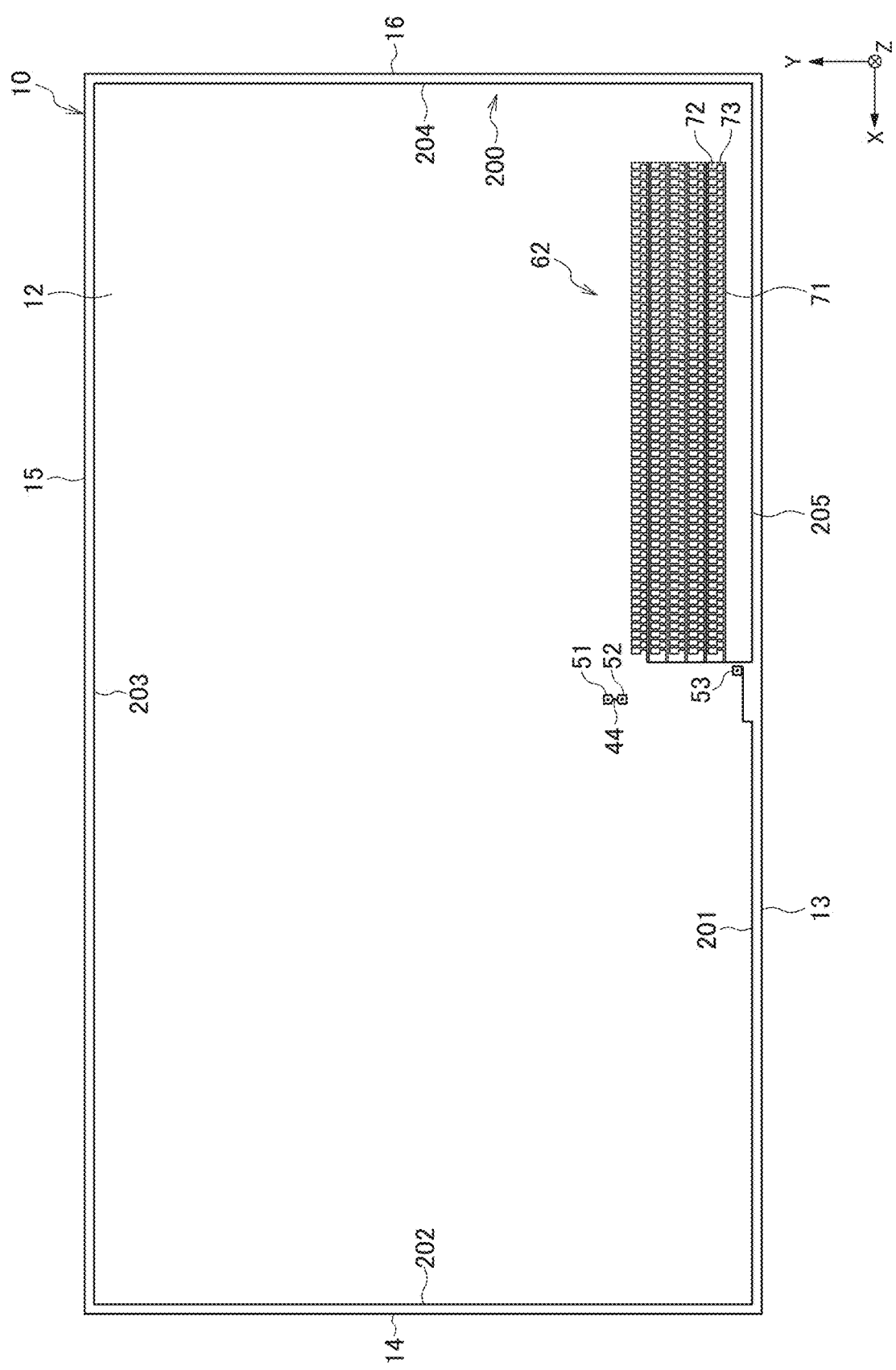
FIG. 3 is a schematic plan view for explaining the pattern shapes of conductor patterns formed on the surface 12 of the first substrate 10 in the first embodiment.

FIG. 3 is a schematic plan view for explaining the pattern shapes of conductor patterns formed on the surface 12 of the first substrate 10.

As illustrated in FIG. 3, a second coil 200, a conductor pattern 44, and a second capacitor electrode pattern 62 are formed on the surface 12 of the first substrate 10. The conductor pattern 44 connects the via conductors 51 and 52. The second coil 200 is wound in about one turn along outer peripheral sides 13 to 16 of the first substrate 10. Thus, the second coil 200 has a shape with a size larger in the X-direction than that in the Y-direction. The second coil 200 includes sections 201, 203, and 205 extending in the X-direction and sections 202 and 204 extending in the Y-direction. When one end of the second coil 200 connected to the via conductor 53 is set as the starting point of winding, the second coil 200 is wound to form the sections 201, 202, 203, 204, and 205 in this order.

The planar position of the second coil 200 as viewed from the surface 11 side of the first substrate 10 is denoted by the dashed line in FIG. 2. As illustrated in FIG. 2, the second coil 200 is disposed outside the first coil 100 as viewed in the Z-direction. The inter-coil distance in the X-direction between the section 132 constituting a first outer edge of the first coil 100 and the section 202 constituting a first inner edge of the second coil 200 is W5. The inter-coil distance in the X-direction between the section 134 constituting a second outer edge of the first coil 100 and the section 204 constituting a second inner edge of the second coil 200 is also W5. The inter-coil distance in the Y-direction between the section 131 constituting a third outer edge of the first coil 100 and the section 201 constituting a third inner edge of the second coil 200 is W6. The inter-coil distance in the Y-direction between the section 133 constituting a fourth outer edge of the first coil 100 and the section 203 constituting a fourth inner edge of the second coil 200 is also W6. The inter-coil distances W5 and W6 are larger than the interval W4. The inter-coil distances W5 and W6 may be smaller than the intervals W1 to W3. The inter-coil distances W5 and W6 may be the same as or different from each other.

As illustrated in FIG. 1, the second coil 200 and the magnetic member 30 overlap each other. The second coil 200 has a size slightly smaller than the outer size of the magnetic member 30, and a distance L between the outer edge of the second coil 200 and the outer edge of the magnetic member 30 is smaller than the inter-coil distances W5 and W6. That is, the second coil 200 is disposed along the outer periphery of the magnetic member 30 so as to overlap the magnetic member 30 as viewed in the Z-direction.

One end of the second coil 200 is connected to the first capacitor electrode pattern 61 formed on the surface 11 of the first substrate 10 through the via conductor 53, and the other end thereof is connected to the second capacitor electrode pattern 62 formed on the surface 12 of the first substrate 10. The first and second capacitor electrode patterns 61 and 62 are both a terminated conductor pattern, and thus both ends of the second coil 200 are opened.

The second capacitor electrode pattern 62 includes a plurality of conductor patterns 71 extending in the X-direction, a plurality of conductor patterns 72 arranged in the X-direction along each of the conductor patterns 71, and a conductor pattern 73 extending in the Y-direction so as to connect its corresponding conductor patterns 71 and 72. Each of the plurality of conductor patterns 72 overlaps its corresponding first capacitor electrode pattern 61 through the first substrate 10. As a result, a capacitor is formed by the first and second capacitor electrode patterns 61 and 62 and the first substrate 10 positioned therebetween. The capacitance of the capacitor can be finely adjusted by removing some conductor patterns 73 by trimming.

As described above, in the antenna device 1 according to the present embodiment, the first coil 100 functioning as an antenna coil has the first, second, and third turns 110, 120, and 130, and the outer sizes thereof are substantially the same in the Y-direction, while significantly different in the X-direction, thereby allowing a coverage area to be extended in the X-direction. In addition, by making the intervals W2 and W3 between the turns in the X-direction substantially the same as the opening width W1 in the X-direction of the first turn 110, communication can be performed properly irrespective of the position of a communication target device in the X-direction, which can prevent the occurrence of a so-called null point.

Further, the second coil 200 functioning as a booster coil is disposed outside the first coil 100, and the intervals W5 and W6 between the first and second coils 100 and 200 are larger than the interval W4 between the turns of the first coil 100 in the Y-direction. This suppresses excessive coupling between the first and second coils 100 and 200 to allow each of the first and second coils 100 and 200 to be adjusted so as to have an optimum resonant frequency, whereby a communication distance can be extended. Further, making the intervals W5 and W6 smaller than the intervals W2 and W3 between the turns of the first coil 100 in the X-direction allows coupling between the first and second coils 100 and 200 to be ensured to some extent and allows communication to be performed through the second coil 200 even when a communication target device is positioned outside the first coil 100 as viewed in the Z-direction.

The following describes a second embodiment of the present disclosure.

As illustrated in FIG. 1, an antenna device 2 according to the second embodiment includes a first substrate 10, a first coil 100 formed on one surface 11 of the first substrate 10, and a second coil 300 formed on the other surface 12 of the first substrate 10. The surface 12 of the first substrate 10 is covered with a magnetic member 30. The first coil 100 functions as an antenna coil for performing near-field communication (NFC). The second coil 300 functions as a booster coil for extending a communication distance.

Figure 4:
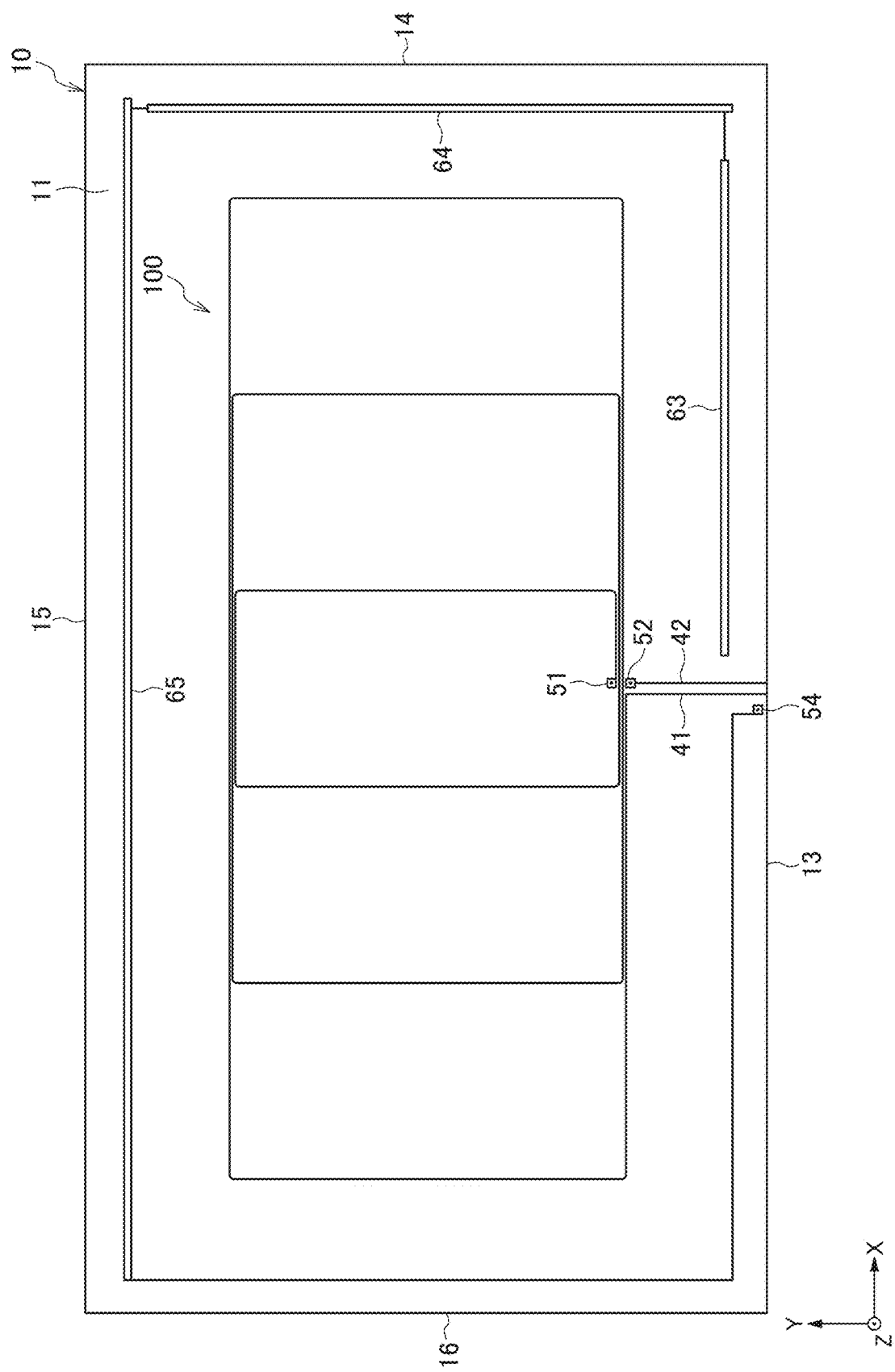
FIG. 4 is a schematic plan view for explaining the pattern shapes of conductor patterns formed on the surface 11 of the first substrate 10 in the second embodiment.

FIG. 4 is a schematic plan view for explaining the pattern shapes of conductor patterns formed on the surface 11 of the first substrate 10 in the second embodiment.

As illustrated in FIG. 4, the first coil 100, conductor patterns 41 and 42, and second capacitor electrode patterns 63 to 65 are formed on the surface 11 of the first substrate 10. The first coil 100 has the same configuration as that described in the first embodiment, so overlapping description will be omitted.

The second capacitor electrode patterns 63 to 65 are disposed respectively along outer peripheral sides 13 to 15 of the first substrate 10 and are mutually connected in series. One end of the series pattern composed of the second capacitor electrode patterns 63 to 65 is connected to a via conductor 54 penetrating the first substrate 10, and the other end thereof is opened.

Figure 5:
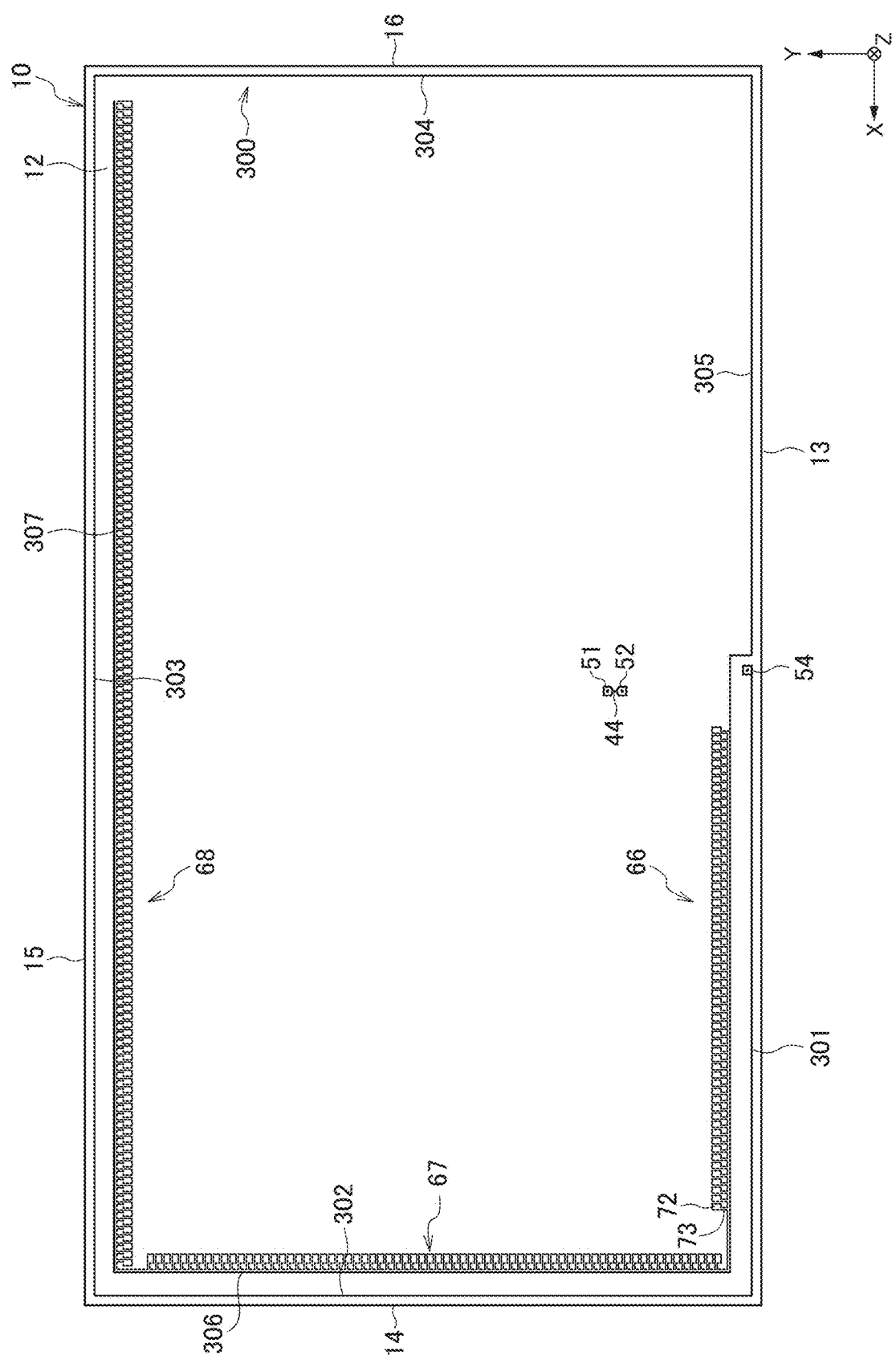
FIG. 5 is a schematic plan view for explaining the pattern shapes of conductor patterns formed on the surface 12 of the first substrate 10 in the second embodiment.

FIG. 5 is a schematic plan view for explaining the pattern shapes of conductor patterns formed on the surface 12 of the first substrate 10 in the second embodiment.

As illustrated in FIG. 5, a second coil 300, a conductor pattern 44, and first capacitor electrode patterns 66 to 68 are formed on the surface 12 of the first substrate 10. The second coil 300 is wound in about 1.5 turns along outer peripheral sides 13 to 16 of the first substrate 10. Thus, the second coil 300 has a shape with a size larger in the X-direction than that in the Y-direction. The second coil 300 includes sections 301, 303, 305, 307 extending in the X-direction and sections 302, 304, and 306 extending in the Y-direction. When one end of the second coil 300 connected to the via conductor 54 is set as the starting point of winding, the second coil 300 is wound to form the sections 301, 302, 303, 304, 305, 306, and 307 in this order. The end portion of the section 307 constituting the other end of the second coil 300 is opened. As in the first embodiment, the second coil 300 is disposed outside the first coil 100 as viewed from the surface 11 side of the first substrate 10.

One end of the second coil 300 is connected to the second capacitor electrode patterns 63 to 65 formed on the surface 11 of the first substrate 10 through the via conductor 54. Further, the second coil 300 is connected with the first capacitor electrode patterns 66 to 68 along the sections 305 to 307. The first capacitor electrode patterns 66 to 68 include a plurality of conductor patterns 72 disposed at mutually different positions along the sections 305 to 307 and a conductor pattern 73 connecting the conductor pattern 72 and the second coil 300. The plurality of conductor patterns 72 overlap their corresponding second capacitor electrode patterns 63 to 65 through the first substrate 10. As a result, a capacitor is formed by the second capacitor electrode patterns 63 to 65, first capacitor electrode patterns 66 to 68, and the first substrate 10 positioned therebetween. The capacitance of the capacitor can be finely adjusted by removing some conductor patterns 73 by trimming.

In addition to the same effects as obtained by the antenna device 1 according to the first embodiment, the antenna device 2 according to the present embodiment has the following effects. That is, since the capacitor electrode patterns 63 to 68 are disposed in a distributed manner, design freedom is enhanced, and, even when the antenna device 2 is used overlapping a power transmission coil for a wireless power transmission device, interference between magnetic flux generated from the power transmission coil and capacitor electrode patterns 63 to 68 is reduced, making it possible to suppress an increase in the AC resistance of the power transmission coil. In addition, the first capacitor electrode patterns 66 to 68 connected to the second coil 300 are disposed between the first and second coils 100 and 300 so as to protrude inside the second coil 300, so that, as compared with when the first capacitor electrode patterns 66 to 68 are disposed between the sections 301 and 305 of the second coil 300, it is possible to carry out trimming of the conductor pattern of the second coil 300 easily while preventing unintended breakage thereof. Furthermore, since the interval between the turns of the second coil 300 can be reduced, when a communication target device is positioned outside the first coil 100 as viewed in the Z-direction, coupling between the second coil 300 and the communication target device can be enhanced.

Figure 6:
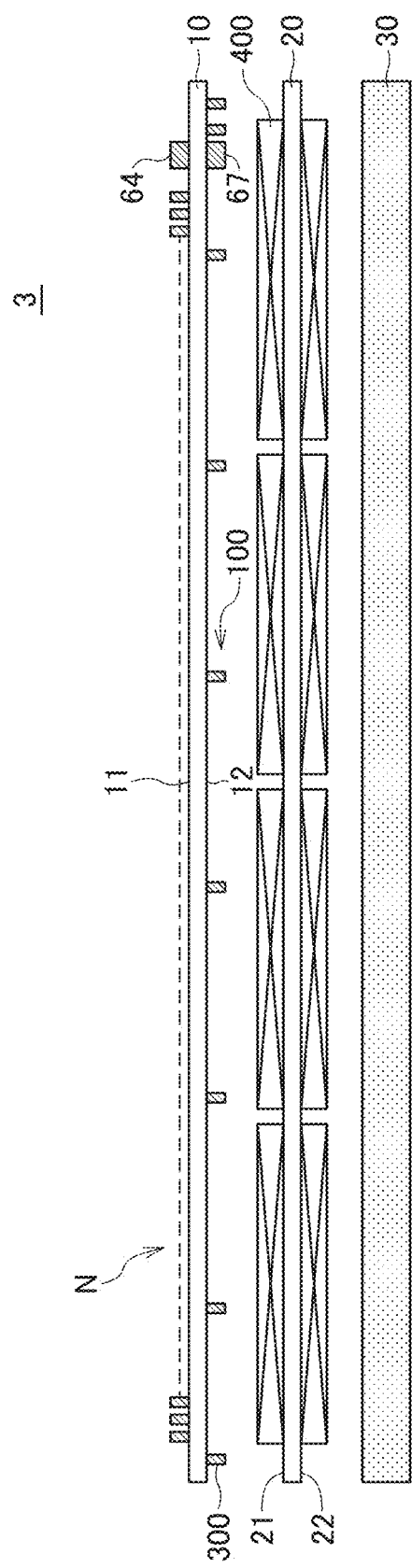
FIG. 6 is a schematic cross-sectional view illustrating the configuration of a wireless power transmission device 3 according to a third embodiment of the present disclosure.

FIG. 6 is a schematic cross-sectional view illustrating the configuration of a wireless power transmission device 3 according to a third embodiment of the present disclosure.

As illustrated in FIG. 6, the wireless power transmission device 3 according to the third embodiment includes first and second substrates 10 and 20, a noise suppressing pattern N formed on one surface 11 of the first substrate 10, first and second coils 100 and 300 formed on the other surface 12 of the first substrate 10, and a plurality of power transmission coils 400 formed on one and the other surfaces 21 and 22 of the second substrate 20. Like the first substrate 10, the second substrate 20 is a film made of an insulating resin material such as PET (Polyethylene Terephthalate) or PI (Polyimide).

The first coil 100 functions as an antenna coil for performing near-field communication (NFC). The second coil 300 functions as a booster coil for extending a communication distance. The power transmission coil 400 is used for power transmission in wireless power transmission. The surface 22 of the second substrate 20 is covered with a magnetic member 30, whereby inductance is enhanced.

Figure 7:
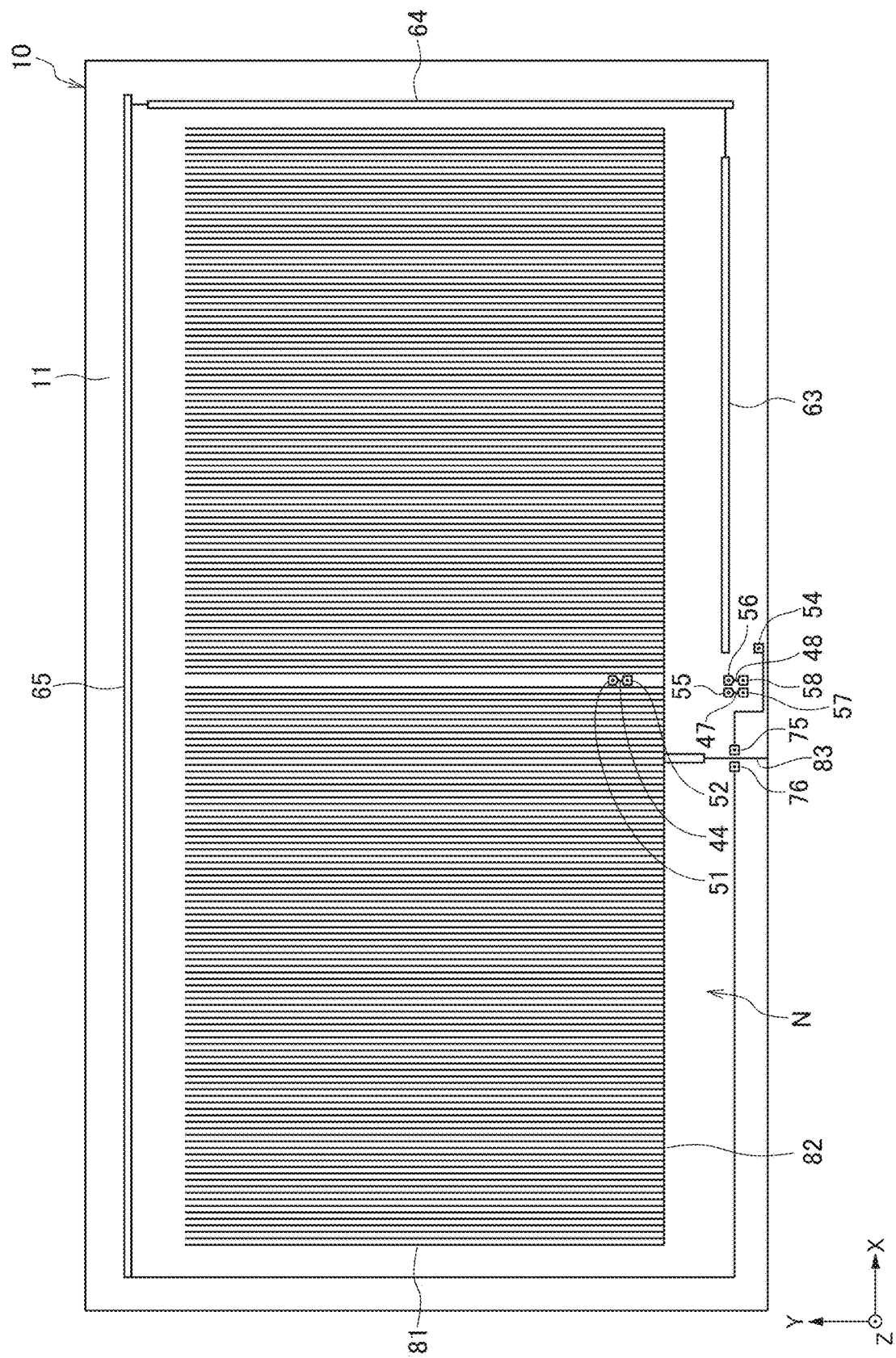
FIG. 7 is a schematic plan view for explaining the pattern shapes of conductor patterns formed on the surface 11 of the first substrate 10 in the third embodiment.

FIG. 7 is a schematic plan view for explaining the pattern shapes of conductor patterns formed on the surface 11 of the first substrate 10 in the third embodiment.

As illustrated in FIG. 7, the noise suppressing pattern N, conductor patterns 47 and 48, and second capacitor electrode patterns 63 to 65 are formed on the surface 11 of the first substrate 10. The second capacitor electrode patterns 63 to 65 illustrated in FIG. 7 are basically the same in position and shape as the second capacitor electrode patterns 63 to 65 illustrated in FIG. 4, so overlapping description will be omitted.

The noise suppressing pattern N includes a plurality of linear patterns 81 extending in the Y-direction, a connection pattern 82 extending in the X-direction and connecting the plurality of linear patterns 81, and a lead-out pattern 83 connected to the connection pattern 82 and constituting a terminal electrode. In the example illustrated in FIG. 7, the plurality of linear patterns 81 linearly extend in the Y-direction and arranged in the X-direction at a constant pitch, but not limited to this. For example, the plurality of linear patterns 81 may extend in the Y-direction while meandering. Alternatively, the extending direction of the plurality of linear patterns 81 may be inclined at a predetermined angle with respect to the Y-direction. Further alternatively, the arrangement pitch between the plurality of linear patterns 81 in the X-direction may differ depending on the planar position.

Figure 8:
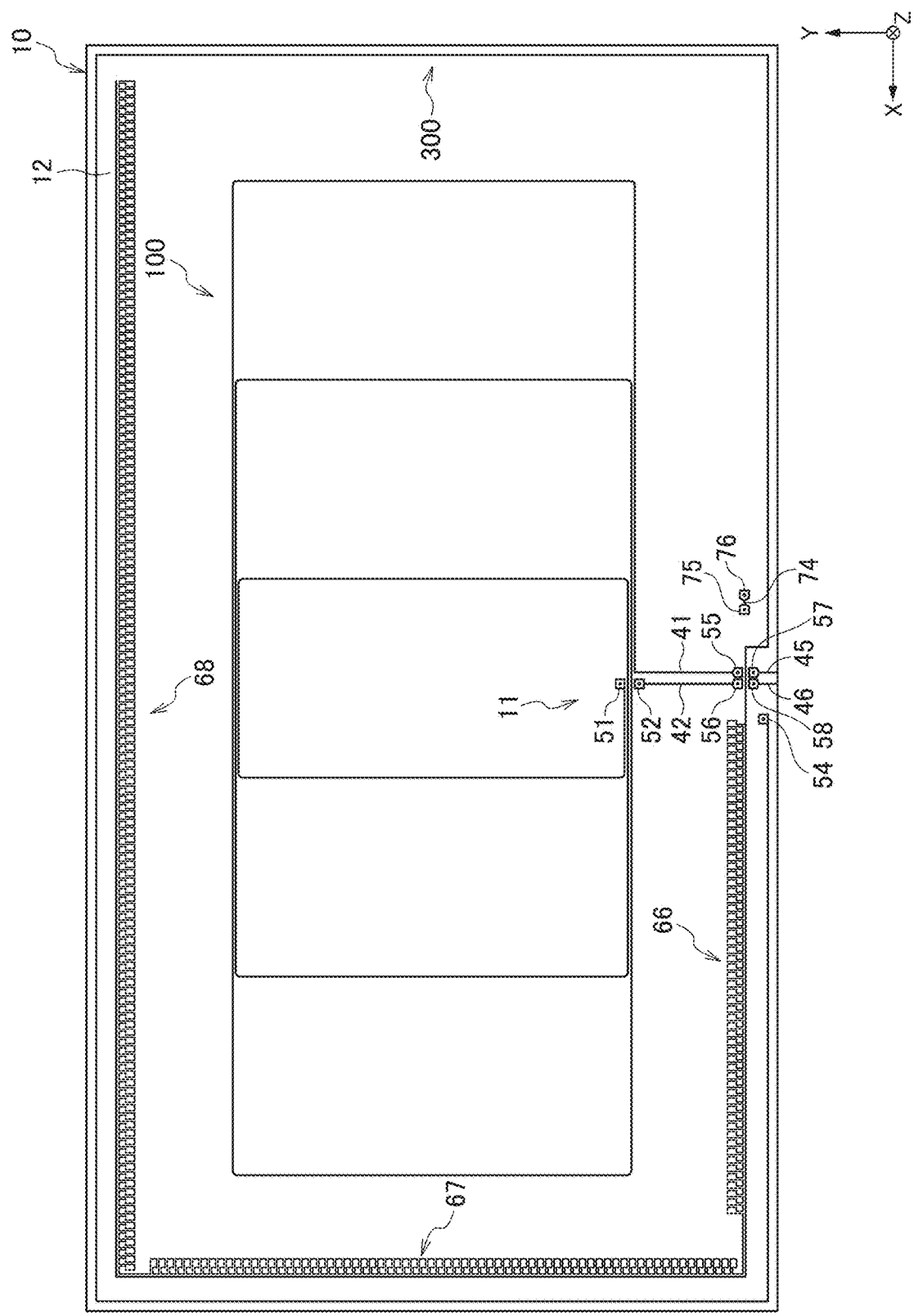
FIG. 8 is a schematic plan view for explaining the pattern shapes of conductor patterns formed on the surface 12 of the first substrate 10 in the third embodiment.

FIG. 8 is a schematic plan view for explaining the pattern shapes of conductor patterns formed on the surface 12 of the first substrate 10 in the third embodiment.

As illustrated in FIG. 8, in addition to the first coil 100 and second coil 300, conductor patterns 41, 42, 45, 46, and 74 and first capacitor electrode patterns 66 to 68 are formed on the surface 12 of the first substrate 10. The conductor pattern 74 is a pattern for connecting the second capacitor electrode patterns 63 to 65 to a via conductor 54 through via conductors 75 and 76. The structure of the first coil 100 is the same as that of the first embodiment, so overlapping description will be omitted. Similarly, the structures of the second coil 300 and first capacitor electrode patterns 66 to 68 are the same as those of the second embodiment, so overlapping description will be omitted. As described above, in the present embodiment, the first and second coils 100 and 300 are formed on the same surface of the first substrate 10.

The conductor pattern 41 is connected to the conductor pattern 45 through the conductor pattern 47 and a via conductor 57. Similarly, the conductor pattern 42 is connected to the conductor pattern 46 through a via conductor 56, the conductor pattern 48, and a via conductor 58. The end portions of the respective conductor patterns 45 and 46 constitute a pair of signal terminals connected to the first coil 100. Also in the present embodiment, a capacitor is formed by the second capacitor electrode patterns 63 to 65, first capacitor electrode patterns 66 to 68, and the first substrate 10 positioned therebetween.

Figure 9:
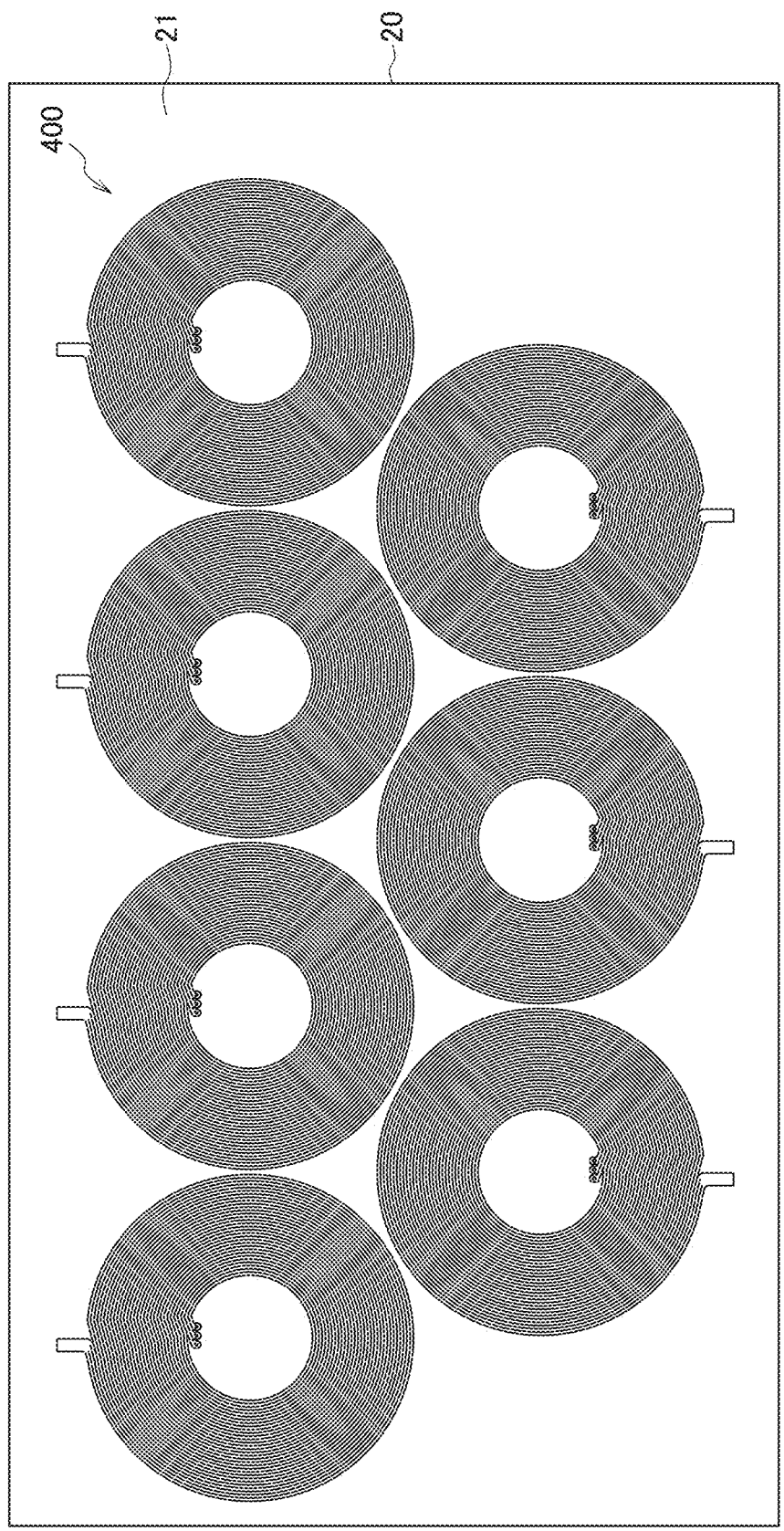
FIG. 9 is a schematic plan view for explaining the pattern shapes of conductor patterns formed on the surface 21 of the second substrate 20 in the third embodiment.

FIG. 9 is a schematic plan view for explaining the pattern shapes of conductor patterns formed on the surface 21 of the second substrate 20 in the third embodiment.

As illustrated in FIG. 9, a plurality of (seven in the example illustrated in FIG. 9) power transmission coils 400 are formed on the surface 21 of the second substrate 20. Similarly, a plurality of power transmission coils 400 are formed on the surface 22 of the second substrate 20. Two power transmission coils 400 overlapping each other on both the front and back sides are connected to each other at their inner peripheral ends. By forming, on the second substrate 20, the plurality of power transmission coils 400 whose coil axes are different in planar position from one another, wireless power transmission can be achieved efficiently irrespective of the planar position of a power receiving coil.

As described above, the first coil 100, second coil 300, and second capacitor electrode patterns 63 to 68 illustrated in FIGS. 8 and 9 have basically the same configuration as those in the antenna device 2 according to the second embodiment. In the present embodiment, an antenna device having such a configuration and the plurality of power transmission coils 400 are disposed to overlap each other in the Z-direction which is the coil axis direction.

Figure 10:
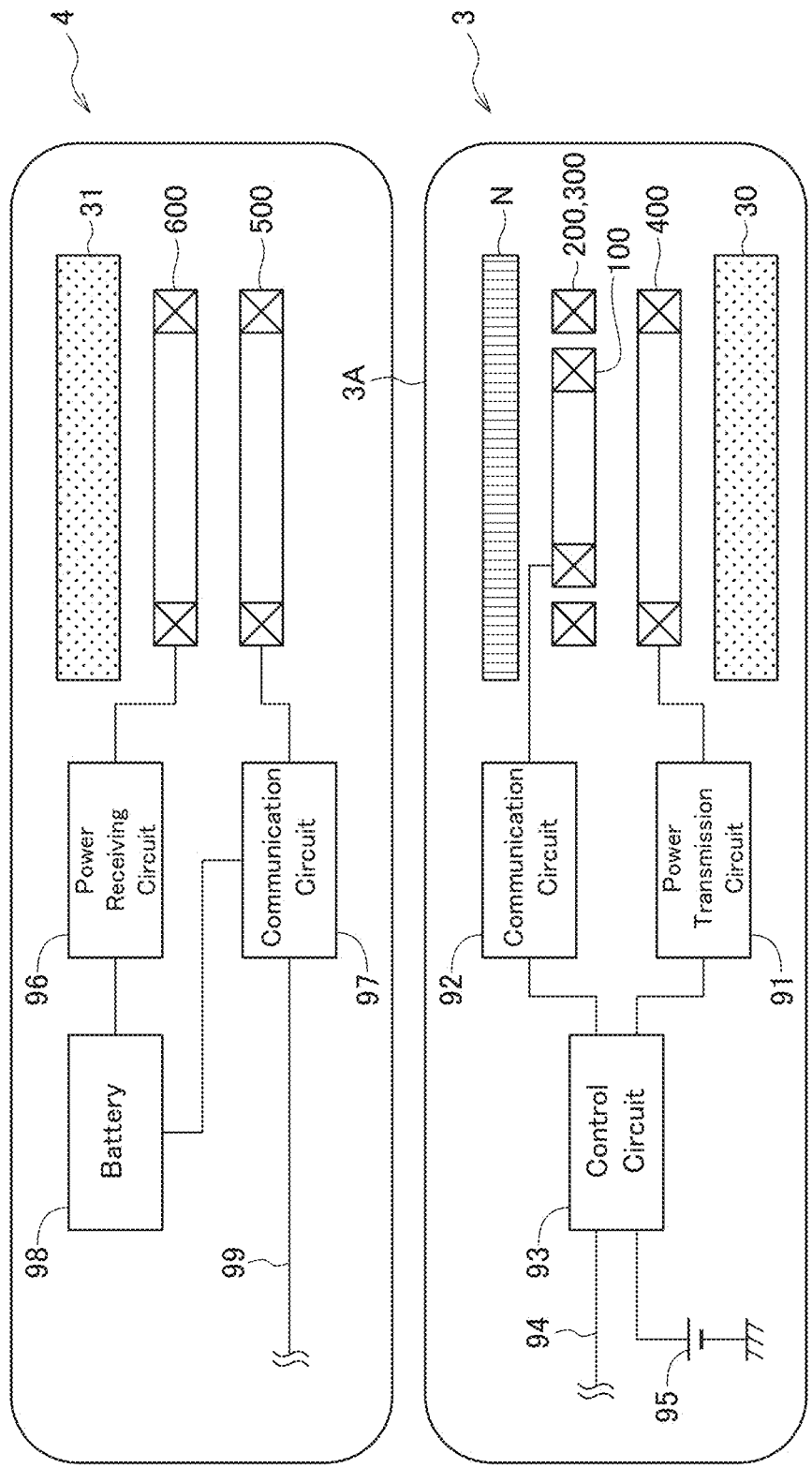
FIG. 10 is a block diagram illustrating the wireless power transmission device 3 a and a mobile communication device 4 to be wirelessly connected thereto.

FIG. 10 is a block diagram illustrating the wireless power transmission device 3 according to the present embodiment and a mobile communication device 4 to be wirelessly connected thereto.

As illustrated in FIG. 10, the wireless power transmission device 3 according to the present embodiment includes a power transmission circuit 91 connected to the power transmission coil 400, a communication circuit 92 connected to the first coil 100, and a control circuit 93 connected to the power transmission circuit 91 and communication circuit 92. The second coil 200 or 300 functioning as a booster coil is disposed outside the first coil 100. With this configuration, data transmitted and received through a communication line 94 can be communicated through the first coil 100 as an antenna coil for NFC, and electric power supplied from a power supply 95 can be wirelessly transmitted through the power transmission coil 400 for wireless power transmission.

The mobile communication device 4 such as a smartphone includes a power receiving coil 600, an antenna coil 500 for NFC, a power receiving circuit 96 connected to the power receiving coil 600, a communication circuit 97 connected to the antenna coil 500, and a battery 98 connected to the power receiving circuit 96 and communication circuit 97. The power receiving coil 600 is coupled to the power transmission coil 400, and the antenna coil 500 as a communication coil is coupled to the first coil 100 as a communication coil. To enhance coupling between these coils, a magnetic member 31 is provided in the mobile communication device 4. With this configuration, data transmitted and received through a communication line 99 can be communicated through the antenna coil 500, and electric power that the power receiving coil 600 has received is fed, through the power receiving circuit 96, to the battery 98 for charging. The battery 98 serves as an operation power supply for the communication circuit 97 and the like.

The wireless power transmission device 3 according to the present embodiment has the noise suppressing pattern N disposed between the power transmission coil 400 and a placing surface 3A of a housing thereof, thereby reducing radiation noise generated from the power transmission coil 400. That is, most of magnetic flux generated from the power transmission coil 400 interlinks with the power receiving coil 600 to make an AC current flow in the power receiving coil 600. However, a part of magnetic flux generated from the power transmission coil 400 is radiated to the surroundings as radiation noise without interlinking with the power receiving coil 600. Such radiation noise may cause malfunction of surrounding electronic devices and is thus desirably reduced as much as possible. The noise suppressing pattern N is provided for reducing such radiation noise. By disposing the noise suppressing pattern N at a position between the power transmission coil 400 and the power receiving coil 600 and near the power transmission coil 400, it is possible to shield much radiation noise while maintaining the amount of magnetic flux that interlinks with the power receiving coil 600. Further, in the present embodiment, the capacitor electrode patterns 63 to 68 are disposed in a distributed manner, so that a sufficient installation space for the noise suppressing pattern N is left on the surface 11 of the first substrate 10, making it possible to enhance noise suppressing effect.

While the preferred embodiment of the present disclosure has been described, the present disclosure is not limited to the above embodiment, and various modifications may be made within the scope of the present disclosure, and all such modifications are included in the present disclosure.

For example, the first coil 100, second coil 300, and conductive coil 400 may each constitute a conductor pattern by winding a conductive wire.

Further, the conductor patterns formed on the surfaces 11 and 12 of the first substrate 10 and the surfaces 21 and 22 of the second substrate 20 may be provided thereon through another material layer containing resin.

The technology according to the present disclosure includes the following configuration examples but not limited thereto.

An antenna device according to the present disclosure includes a first coil wound in a plurality of turns and a second coil disposed outside the first coil as viewed in the coil axis direction of the first coil. The first coil is configured such that a first interval between turns in a first direction is larger than a second interval between turns in a second direction perpendicular to the first direction, and the inter-coil distance between the outer edge of the first coil and the inner edge of the second coil is larger than the second interval as viewed in the coil axis direction. With this configuration, there can be achieved an antenna device providing a sufficiently wide coverage area and communication distance.

In the above antenna device, the inter-coil distance may be smaller than the first interval. This allows coupling between the first and second coils to be ensured to some extent and allows communication to be performed through the second coil even when a communication target device is positioned outside the first coil.

In the above antenna device, the first interval may be substantially equal to the width in the first direction of an opening formed by the innermost turn of the first coil. This can prevent the occurrence of a so-called null point.

In the above antenna device, opposite ends of the second coil may be opened. This eliminates the need to connect the second coil to another external circuit.

The antenna device according to the present disclosure may further include a first capacitor electrode pattern connected to one end of the second coil and a second capacitor electrode pattern connected to the other end of the second coil and overlapping the first capacitor electrode pattern. With this configuration, a resonance circuit is formed by the second coil and a capacitor.

The antenna device according to the present disclosure may further include a plurality of first capacitor electrode patterns disposed along the second coil and connected respectively to different positions of the second coil and a second capacitor electrode pattern connected to one end of the second coil and overlapping the plurality of first capacitor electrode patterns. This enhances design freedom. Further, even when the antenna device is used overlapping a power transmission coil for a wireless power transmission device, interference between magnetic flux generated from the power transmission coil and the first and second capacitor electrode patterns is reduced, making it possible to suppress an increase in the AC resistance of the power transmission coil.

In the above antenna device, the plurality of first capacitor electrode patterns may be disposed between the first and second coils. This makes it possible to carry out trimming of the conductor pattern of the second coil easily while preventing breakage thereof. Further, when a communication target device is positioned outside the first coil, coupling between the second coil and the communication target device can be enhanced.

The antenna device according to the present disclosure may further include a magnetic member overlapping the first coil as viewed in the coil axis direction, and the distance between the outer edge of the second coil and the outer edge of the magnetic member may be smaller than the inter-coil distance. This can further extend the antenna coverage area.

The antenna device according to the present disclosure may further include a substrate and a conductor pattern disposed on one main surface of the substrate and including a plurality of linear patterns extending in the second direction and a connection pattern connecting the plurality of linear patterns, and the first and second coils may be disposed on the other main surface of the substrate. This can reduce radiation noise.

A wireless power transmission device according to the present disclosure includes the above-described antenna device and a plurality of power transmission coils disposed in such a way as to overlap the antenna device in the coil axis direction. With the thus configured wireless power transmission device, it is possible to perform not only communication but also wireless power transmission.

What is claimed is:

1. An antenna device comprising:
   a first coil wound in a plurality of turns; and
   a second coil disposed outside the first coil as viewed in a coil axis direction of the first coil,
   wherein the first coil is configured such that a first interval between turns in a first direction is larger than a second interval between turns in a second direction perpendicular to the first direction, and
   wherein an inter-coil distance between an outer edge of the first coil and an inner edge of the second coil is larger than the second interval as viewed in the coil axis direction.

2. The antenna device as claimed in claim 1, wherein the inter-coil distance is smaller than the first interval.

3. The antenna device as claimed in claim 1, wherein the first interval is substantially equal to a width in the first direction of an opening formed by an innermost turn of the first coil.

4. The antenna device as claimed in claim 1, wherein opposite ends of the second coil are opened.

5. The antenna device as claimed in claim 4, further comprising:
   a first capacitor electrode pattern connected to one end of the second coil; and
   a second capacitor electrode pattern connected to other end of the second coil and overlapping the first capacitor electrode pattern.

6. The antenna device as claimed in claim 4, further comprising:
   a plurality of first capacitor electrode patterns disposed along the second coil and connected respectively to different positions of the second coil; and
   a second capacitor electrode pattern connected to one end of the second coil and overlapping the plurality of first capacitor electrode patterns.

7. The antenna device as claimed in claim 6, wherein the plurality of first capacitor electrode patterns are disposed between the first and second coils.

8. The antenna device as claimed in claim 6, further comprising:
   a substrate having a first surface and a second surface; and
   a conductor pattern disposed on the first surface of the substrate,
   wherein the conductor pattern includes a plurality of linear patterns extending in the second direction and a connection pattern connecting the plurality of linear patterns, and
   wherein the first and second coils are disposed on the second surface of the substrate.

9. The antenna device as claimed in claim 1, further comprising a magnetic member overlapping the first coil as viewed in the coil axis direction,
   wherein a distance between an outer edge of the second coil and an outer edge of the magnetic member is smaller than the inter-coil distance.

10. A wireless power transmission device comprising:
    an antenna device; and
    a plurality of power transmission coils,
    wherein the antenna device comprises:
       a first coil wound in a plurality of turns; and
       a second coil disposed outside the first coil as viewed in a coil axis direction of the first coil,
    wherein the first coil is configured such that a first interval between turns in a first direction is larger than a second interval between turns in a second direction perpendicular to the first direction,
    wherein an inter-coil distance between an outer edge of the first coil and an inner edge of the second coil is larger than the second interval as viewed in the coil axis direction, and
    wherein the plurality of power transmission coils are disposed in such a way as to overlap the antenna device in the coil axis direction.

* * * * *